(No Model.) 2 Sheets—Sheet 1.

C. PALMER & H. G. BROWNELL.
FILTERING APPARATUS.

No. 599,009. Patented Feb. 15, 1898.

Witnesses.
A. L. Dembitz
M. A. Broderick

Chase Palmer and
H. G. Brownell
Inventors
by Lewis N Dembitz
Attorney (No Model.) 2 Sheets—Sheet 2.

C. PALMER & H. G. BROWNELL.
FILTERING APPARATUS.

No. 599,009. Patented Feb. 15, 1898.

Witnesses.
A. L. Dembitz
M. A. Brodrick

Inventors
C. Palmer and H. G. Brownell
by Lewis N. Dembitz
Attorney.

THE NORRIS PETERS CO., PHOTO-LITHO., WASHINGTON, D. C.

UNITED STATES PATENT OFFICE.

CHASE PALMER AND HARRY G. BROWNELL, OF LOUISVILLE, KENTUCKY.

FILTERING APPARATUS.

SPECIFICATION forming part of Letters Patent No. 599,009, dated February 15, 1898.

Application filed January 2, 1897. Serial No. 617,765. (No model.)

*To all whom it may concern:*

Be known that we, CHASE PALMER and HARRY G. BROWNELL, citizens of the United States, residing at Louisville, in the county of Jefferson and State of Kentucky, have invented a new and useful Filtering Apparatus, of which the following is a specification.

Our invention relates to filtering water either on a great scale at the reservoir from which a whole city is supplied or in a small way for one house. Its main feature is to let the water run through a cell through which a strong electric current passes and in which iron plates are suspended, so that some of them are oxidized and scales of the oxid are distributed in the water and will catch up silt and germs too fine to be kept back by a common filter. The water is then passed from a cell into a sand filter, which with the scum holding the scales of the oxid also keeps back the silt and germs caught up therein. The germs not thus filtered out are decomposed and deadened by the oxygen set free by electrolysis. We are aware that electricity has been used for such a purpose, but only in connection with magnets and not with a filter, or with a view to a filter and not so as to reach a commercial result, while our invention filters water at a cost low enough for use.

Figures 1, 3:
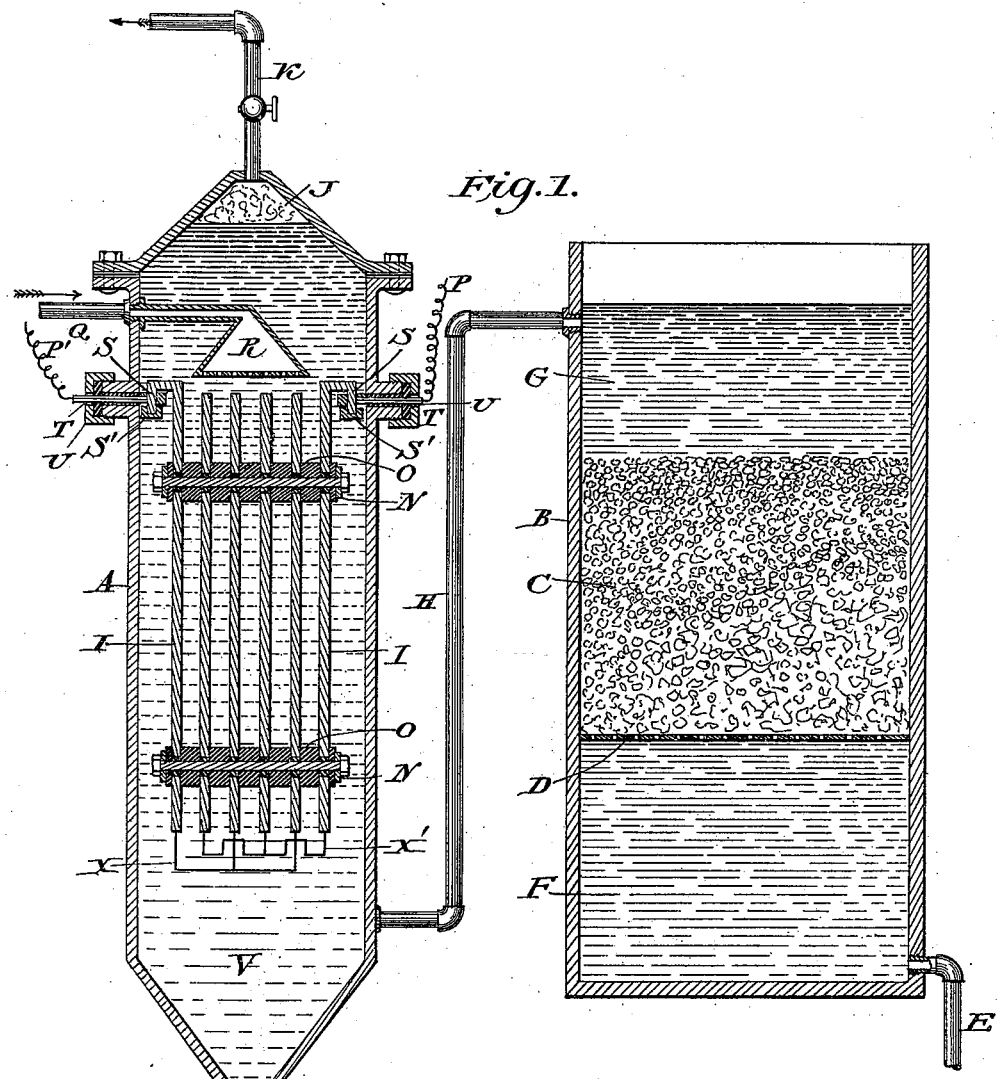
Figure 2:
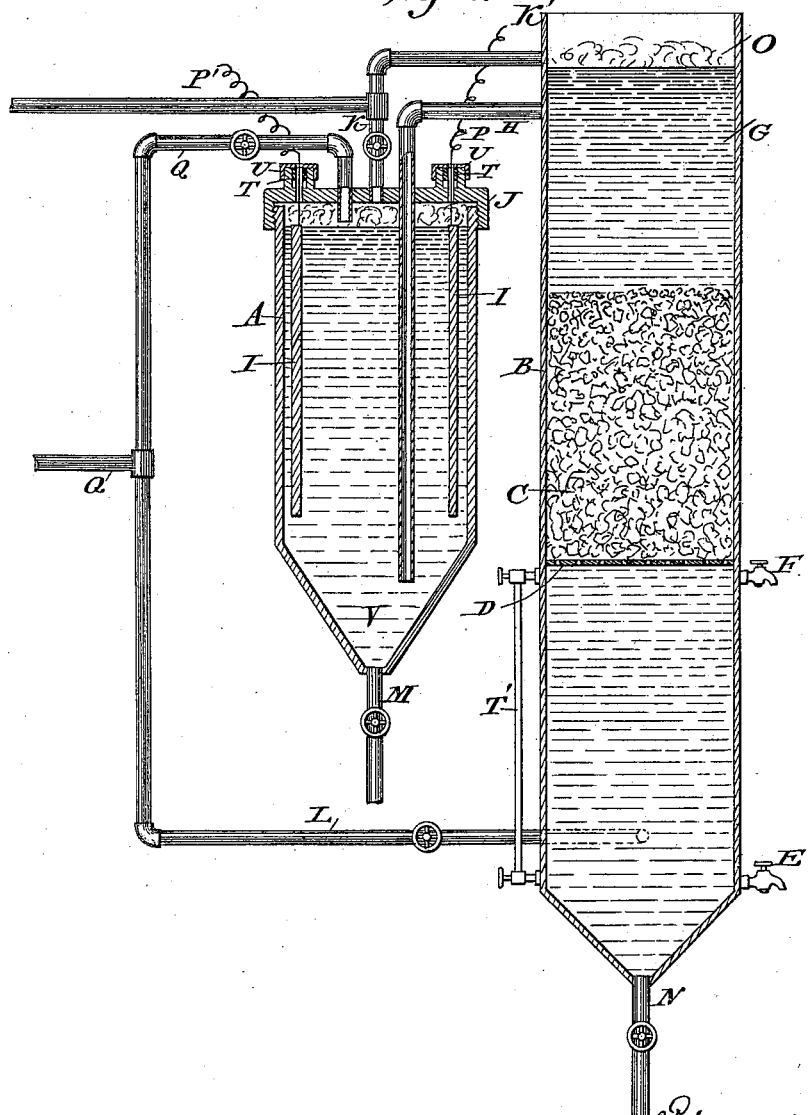

We attain these objects by the mechanism illustrated in the accompanying drawings, of which the first sheet, with Figure 1, represents the apparatus in the shape for filtering on a large scale, the other sheet, with Fig. 2, as it may be constructed for domestic use. Both figures give vertical sections both of the cell, with the pipes and wires entering and leaving it and which with its contents is the subject-matter of our invention and which is shown on the left side of each figure, and of a sand filter as now in use on the right, connected with the cell, as shown in the drawings. When the process is carried on upon a large scale, a number of filters may be connected with each cell, but each in the manner shown, and no separate drawing or explanation is needed to illustrate such connection. Fig. 3 shows the inlet of the wires on a larger scale.

As far as the large and the small apparatus contain the same parts they are designated on all the figures by the same letters.

An electric current of the needed strength is generated by a dynamo, and this in turn is worked by a steam-engine or water-wheel; but our invention does not relate to these. Hence the drawings only show the wires P and P', by which the current is brought from the dynamo to the cell. These wires are thickened into eyebolts or rods when they enter the cell. This cell A may for the large apparatus be made of iron, wood, or other material; for a small apparatus, preferably of porcelain-lined iron or of glass. It ends at the bottom in an inverted cone. For the large apparatus the cell at the top also runs into a cone, while the small cell has a flat lid or cover screwed to it by a rubber gasket, which is inserted between the body of the cell and the cover. The wires P P' enter a large cell through packing-boxes at the sides below the conical head. For a small cell it will be more convenient to pass them through the lid or cover through holes. In either case the packing-boxes or holes are lined or bushed with insulating material. The packings for the boxes or holes are marked by the letters T T. The water to be filtered comes into the cell through the pipe Q. As a matter of convenience, this pipe also enters a large cell from the side near the top, a small cell through the lid or cover. In the former the pipe Q ends in the cone R, widening downward, with a coarse-sieve bottom, through which the water falls evenly on and between the electrodes. In a small cell this cone and sieve are not needed. The electrodes I I are plates of iron (preferably wrought-iron) of thickness, length, width, and number proportioned to the mass of water to be cleansed and to the quantity of impurities to be removed. In a small cell the plates are hung from the wires. In a large cell one must weld or fasten to each of the outermost anode and cathode plates an angular piece S, which passes through the eye of a bolt passing through the bushing T, the wires P P' thickening into said bolts. The angular pieces are kept in place by the screw-head S', and any other convenient support may be added to or put in place of these angular pieces.

In a small apparatus four, or even two, plates will suffice. In a large one six or more will be needed. In the large apparatus all the plates are held together by two or more iron bolts N N, which run through them in non-conducting bushings, and they are kept apart by non-conducting washers O O. However, the first, third, and other odd-numbered plates, counting from either side, are connected by conducting but insulated wires or rods, (marked X X',) so that odd-numbered plates form substantially a single electrode and the even-numbered plates another.

As the oxygen freed by the decomposition of water will attack only the anodes, the cathodes may be made of another metal or of carbon, which in a small apparatus might have its conveniences.

Each of the figures show at the top a pipe K, which may be closed by a valve. It is a waste-pipe to carry off the freed gases and such scum J as may be driven upward by them. There is another waste-pipe M, with its valve, at the bottom to carry off heavy sediment.

The plates do not reach to the bottom of the cell. The water below them is indicated by the letter V. It is from here that the water is led off into the filter. In a large apparatus one or more pipes H carry it from the side of the cell near its lower end to the upper part of a filter. In a small apparatus let this pipe H dip down into the water at V and rise within the cell to its lid and through it horizontally to the filter. The lid of the small cell will thus be pierced with five holes, two for the wires or rods P P' and three for pipes—that is, for the inlet-pipe Q, the waste-pipe K, and the outlet-pipe H.

The outer wall of the filter is marked B. G is the space above the sand; D, the perforated bottom on which it rests; F, the space under it.

In a large filter the purified water is let off by a pipe at its bottom E, while in a small filter faucets might be put at E and F at the side and a waste-pipe N put at the bottom; also, a glass gage T might be attached to show the quantity of pure water gained.

For large filters there are now several well-known means for rewashing. For a small filter it would be convenient to connect the inlet-pipe with one marked L, which passes into the bottom of the filter, and to connect the top of the filter by the pipe K' with the waste-pipe K, by which means, when the pipes Q and K are shut off from the cell, the filter can be rewashed.

The means for rewashing the small filter and the gage are not shown with the view of claiming any novelty in them, but only in order to exhibit a complete apparatus.

What we claim as our invention, and desire to protect by Letters Patent, is—

1. In a filtering apparatus, in combination, a closed cell, fitted with one inlet-pipe near its top, and with wires leading from a dynamo through insulating-bushing within perforations in the cell also near its top, one or more iron plates hanging from the anode-wire, other plates of metal or carbon hanging from the cathode-wire, the cell having considerable room below the hanging plates, with a waste-pipe at the bottom and free space above the plates with a blow-off pipe, also one or more pipes leading from the cell into the upper part of one or more sand filters, substantially as shown in the drawings.

2. In an apparatus for purifying water, a closed cell, fitted with an inlet-pipe near its top, with two wires leading from a dynamo through insulating-bushing within perforations in the cell, also near its top, one or more iron plates hanging from the anode-wire, other plates of metal or carbon hanging from the cathode-wire, the cell having considerable room in the shape of an inverted cone below the hanging plates, with a waste-pipe at the bottom, and considerable room above the wires and plates with a blow-off pipe at the top, and one or more exit-pipes from the vessel, substantially as shown in the drawings.

CHASE PALMER.
HARRY G. BROWNELL.

Witnesses:
M. A. BRODERICK,
G. W. GOSNELL.